United States Patent [19]
Fester

[11] 3,968,687
[45] July 13, 1976

[54] BATTERY ELECTROLYTE INDICATOR DEVICE

[75] Inventor: Ronald C. Fester, Rutherford, N.J.

[73] Assignee: Walter Kidde & Company, Inc., Belleville, N.J.

[22] Filed: May 23, 1975

[21] Appl. No.: 580,480

[52] U.S. Cl. .................................. 73/291; 73/308; 73/447; 200/83 C
[51] Int. Cl.² ........................................ G01F 23/12
[58] Field of Search ............. 73/291, 305, 306, 307, 73/308, 311, 313, 447; 200/84 A, 84 C; 340/244 A; 116/110, 118 R

[56] References Cited
UNITED STATES PATENTS

| 2,405,140 | 8/1946 | Grimm | 200/84 C |
| 2,907,844 | 10/1959 | Lindsey | 200/84 R |
| 3,293,579 | 12/1966 | Harper | 340/244 A X |
| 3,471,664 | 10/1969 | Hansen | 200/84 C |
| 3,478,184 | 11/1969 | Cofoid | 200/84 C |
| 3,602,665 | 8/1971 | Jarvis et al. | 200/84 C |
| 3,781,498 | 12/1973 | Kamil et al. | 200/84 C |
| 3,849,771 | 11/1974 | Applin | 200/84 C X |

FOREIGN PATENTS OR APPLICATIONS

| 1,117,893 | 11/1961 | Germany | 73/308 |

*Primary Examiner*—Richard C. Queisser
*Assistant Examiner*—Joseph W. Roskos
*Attorney, Agent, or Firm*—Darby & Darby

[57] ABSTRACT

A device for indicating the specific gravity and/or the level of the electrolyte in a wet storage battery with the device having a magnetically actuated switch which is energized by a magnet on a floatation member which senses both specific gravity and the electrolyte level. An adjustable bias magnet is provided to modify the magnetic force applied by the first magnet on the switch to accommodate for manufacturing tolerances in the device and also to accommodate for dimensional differences in battery construction.

9 Claims, 1 Drawing Figure

U.S. Patent   July 13, 1976   3,968,687
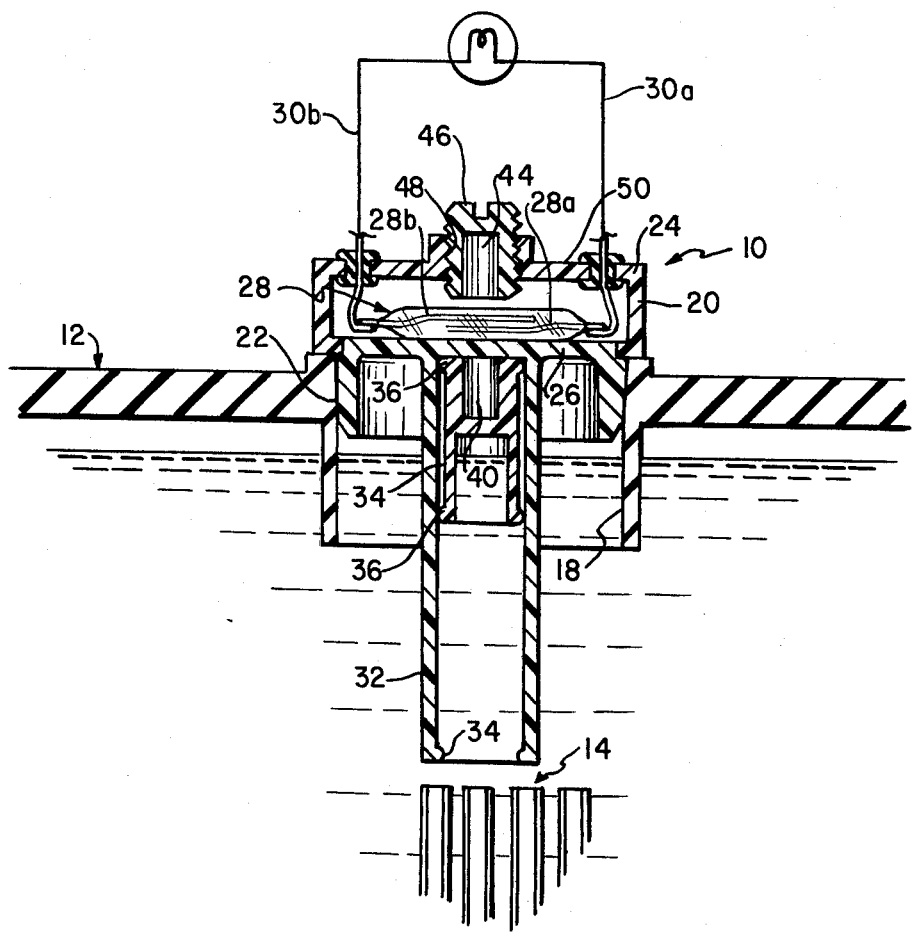

BATTERY ELECTROLYTE INDICATOR DEVICE

Many types of equipment are powered by wet storage batteries. In some applications, for example in emergency lighting, fire alarm systems and burglar alarm systems, the status of the battery is critical. Therefore it is necessary to have an indication of whether or not the battery is fully charged and also of its electrolyte level. As is known, when the electrolyte level is low, the battery charge has a tendency to drain off. Further, low specific gravity of the electrolyte indicates lack of charge. The electrolyte level is normally checked either visually or by test operating the equipment. The electrolyte specific gravity is tested by a hydrometer. All of the aforesaid testing procedures are sometimes inconvenient and time consuming and not continuous.

The present invention relates to a device for providing an indication of the status of a wet storage battery and, more specifically, the electrolyte level and specific gravity. In accordance with the invention, an indicator device is provided which is directly mounted in one of the fill holes of the battery or into an auxiliary hole. The device includes a normally open type of magnetically operated switch which is held closed by the force produced by an adjustable bias magnet. A permanent magnet is located on a floatation device in communication with the battery electrolyte. The magnet, if properly positioned, can act on the switch to open it. The specific gravity and electrolyte level determine the position of the floatation-mounted magnet so that when both the electrolyte level and the specific gravity are proper, or within prescribed limits, the floatation magnet is moved to a position where it opens the magnetically operated switch. The bias magnet operates in conjunction with the switch and magnetically in opposition to the floatation magnet so that the relative position of the floatation magnet with respect to the switch for opening and closing the switch can be set. The switch is preferably connected to operate an indicator or alarm.

Liquid level indicator devices are known. For example in U.S. Pat. Nos. 2,927,175 to Booth and 3,851,566 to Fuller, devices are shown using float carried magnets used to energize switches having magnetic members. Neither of these devices recognize the concept of determining battery charge status as a function of the specific gravity of the electrolyte nor do they use a second magnet to control the effect of the float carried magnet. In U.S. Pat. No. 3,293,579 to Harper, a magnet carried by a float operates in conjunction with a second magnet attached to the actuating arm of a microswitch. A third magnet is used adjacent the second magnet to bias its effect with respect to the switch actuator arm. Other U.S. patents of interest in this general area are Grimm U.S. Pat. No. 2,405,140, Cofoid U.S. Pat. No. 3,478,184 and Lindsey U.S. Pat. No. 2,907,844.

It is therefore an object of the present invention to provide a battery electrolyte level indicator.

A further object is to provide a device to indicate the status of a battery electrolyte and its specific gravity with the device being capable of operating a remotely located indicator or alarm device.

Another object is to provide an indicator for the level and specific gravity of the electrolyte having a magnetically responsive switch operated by a magnet on a floatation device in which the action of the magnet or the switch is controlled by a bias magnet.

Other objects and advantages of the present invention will become more apparent upon reference to the following specification and annexed drawing in which:

The FIGURE is a view in cross section of the indicator device and also shows a portion of a battery.

Referring to the drawing, the indicator device 10 is shown in use with a conventional battery 12 having the usual plates 14 and electrolyte 16 therein. The battery housing has one or more openings 18 into the individual cell compartments.

The indicator device includes a housing 20 in the shape of a standard battery cap having a lower shoulder portion 22 which fits within the cell opening 18 and forms a seal therewith. The housing 20 is preferably made of plastic, for example, by molding. It has an upper hollow cap extension 24 having a base 26 on which is mounted a magnetically actuated switch 28. A so-called reed switch, in a sealed envelope is used with preferred embodiment of the invention. In general, the switch 28 is of the type wherein the bottom contact 28a thereof is magnetically attracted to the upper contact 28b so that the switch would be biased normally closed. Leads 30a and 30b extend outwardly from the respective switch contacts 28a and 28b in the sealed envelope.

Extending from the lower face of the cap base 26, is a dip tube 32 which can be of cylindrical or other suitable shape having an opening 34 in its bottom. A float 35 is located within the tube 32. The float has shoulders 36 adjacent its upper and lower ends to form a seal to prevent fluid from passing from below the lower shoulder 36 and also to act as guides for the float.

A permanent magnet 40 is carried by the float 35. The magnet 40 can be of any suitable type and is held in the float by a press fit to a bore in the upper portion of the float. The magnet also can be held by a suitable adhesive.

A second permanent magnet 44 is held in an adjustable threaded member 46 which is threaded into an opening 48 in the upper wall of the indicator cap 50. Here again, magnet 44 is press fit into member 46 or held by a suitable adhesive.

Switch leads 30a and 30b extend outwardly through insulators on the top 50 of the housing 20. A lamp 52 is connected in series with leads 30a and 30b and a battery 54. The battery can be the battery being monitored or a separate battery. An audible alarm or other suitable indicating device can be used in place of the lamp.

The operation of the indicator device is as follows. The electrolyte liquid in the battery cell enters the opening 34 of the tube 32 and acts on the floatation member 35. The floatation member 35 rises or falls depending both upon the level of the liquid electrolyte and its specific gravity.

When the electrolyte level and/or the specific gravity drops, the float 35 moves down. Thus, the upper pole of magnet 40 (North in the example being considered) will have less effect upon the lower contact 28a of the switch 28 (a magnetic South pole in the example described) and will permit the two switch contacts 28a and 28b to close thereby energizing the lamp 52 or alarm device. When the float 34 is at or rises to the proper level, the latter by the addition of electrolyte fluid, the upper (North) pole of magnet 40 is in opposition to the bias magnet, cancelling its affect causing the switch contacts to return to their normally open position.

The upper adjustable magnet 44 has its lower pole (North in the example described) acting oppositely to the upper (North) pole of floatation magnet 40. That is, the magnet 44 produces a magnet force to act in a direction tending to close the switch contacts 28a and 28b. Adjusting the position of magnet 44, by rotating threaded member 46, brings it closer to or further away from switch contact. Therefore, by this arrangement, the amount of magnetic force needed to be exerted by the floatation magnet 40 on switch 28, to open and close it, that is, the distance of magnet 40 from switch 28, can be controlled.

The second magnet 44 carried by the threaded member 46 provides a simple adjustment for setting the electrolyte level and/or specific gravity needed to open and close the switch in terms of the offsetting magnetic forces of magnets 40 and 44. This adjustment is highly useful with respect to compensating for manufacturing tolerances of the magnets and other members of the indicator, to accommodate for different types of electrolytes, etc. The use of a sealed magnetically actuated switch also provides advantages by way of simplicity of construction and also in preventing the switch from being effected adversely by environmental effects, e.g. moisture.

What is claimed is:

1. A device for determining the level and/or specific gravity of an electrolyte in a wet storage battery having an opening into a cell area, said device comprising:
    a housing for fitting within said opening,
    a magnetically actuated switching means carried by the housing,
    float means positioned to communicate with and be moved by the electrolyte in accordance with its level and/or specific gravity,
    a first permanent magnet means carried by said float means, said first permanent magnet means located with respect to said switching means to exert a magnetic force thereon, said first permanent magnet means causing said switching means to switch from a first to a second condition when said float means reaches a predetermined location in said battery electrolyte, and
    second permanent magnet means carried by said housing and located with respect to said switching means and said first permanent magnet means to exert a magnetic force on said switching means to counteract that of the first permanent magnet means to thereby adjust the position of the predetermined location of said float means where the switching action takes place.

2. A device as in claim 1 wherein the housing is shaped as a cap for the cell opening.

3. A device as in claim 2 wherein a threaded member is mounted on the top of said housing, said threaded member carrying said second permanent magnet means.

4. A device as in claim 3 wherein said magnetically actuated switching means is located between said first and said second permanent magnet means.

5. A device as in claim 4 wherein said magnetically actuated switching means is located in a sealed envelope.

6. A device as in claim 1 further comprising a pair of leads extending from said magnetically actuated switching means, and indicator means electrically connected in circuit with said leads.

7. A device as in claim 1 further comprising a dip tube extending from said housing into the battery electrolyte, said float means being movable relative to said dip tube.

8. A device as in claim 7 wherein said dip tube is tubular in shape and said float means fits within said tube.

9. A device as in claim 8 wherein said float means has a continuous shoulder adjacent to and surrounding its lower end to block fluid from entering the dip tube above the shoulder.

* * * * *